United States Patent
Turakhia (10) Patent No.: US 9,397,966 B2
(45) Date of Patent: Jul. 19, 2016

(54) GROUP MESSAGE RELAY

(71) Applicant: Riva FZC, Ras Al Khaimah (AE)

(72) Inventor: Bhavin Turakhia, Mumbai (IN)

(73) Assignee: Riva FZC (AE)

( * ) Notice: Subject to any disclaimer, the term of this patent is extended or adjusted under 35 U.S.C. 154(b) by 571 days.

(21) Appl. No.: 13/929,329

(22) Filed: Jun. 27, 2013

(65) Prior Publication Data

US 2014/0289343 A1 Sep. 25, 2014

(30) Foreign Application Priority Data

Mar. 21, 2013 (IN) .......................... 944/MUM/2013

(51) Int. Cl.
*H04L 12/58* (2006.01)
*H04L 12/18* (2006.01)

(52) U.S. Cl.
CPC ............ *H04L 51/04* (2013.01); *H04L 12/1822* (2013.01); *H04L 51/043* (2013.01); *H04L 51/046* (2013.01); *H04L 51/32* (2013.01)

(58) Field of Classification Search
CPC . H04L 12/581; H04L 12/582; H04L 12/5815; H04L 51/04; H04L 51/043; H04L 51/046
See application file for complete search history.

(56) References Cited

U.S. PATENT DOCUMENTS

| | | | |
|---|---|---|---|
| 6,564,261 B1 | 5/2003 | Gudjonsson et al. | |
| 7,221,658 B1 | 5/2007 | Armstrong et al. | |
| 8,239,464 B2 * | 8/2012 | Colon | H04L 12/185 370/252 |
| 2005/0044144 A1 * | 2/2005 | Malik | H04L 12/581 709/205 |
| 2006/0020677 A1 * | 1/2006 | Von Koch | H04L 51/24 709/207 |
| 2006/0026237 A1 | 2/2006 | Wang et al. | |
| 2010/0057754 A1 * | 3/2010 | Moudy | G06Q 20/382 707/E17.044 |
| 2010/0062797 A1 | 3/2010 | Kowalewski et al. | |
| 2010/0167763 A1 * | 7/2010 | Bouthemy | H04L 45/16 455/466 |
| 2010/0250693 A1 * | 9/2010 | Zheng | G06Q 10/10 709/206 |
| 2013/0073636 A1 | 3/2013 | Zhu et al. | |

OTHER PUBLICATIONS

"Google Talk Group Chat", [Online]. Retrieved from the Internet: <URL: http://help.trillian.im/discussions/mac/1049-google-talk-group-chat>, (Accessed Sep. 24, 2013), 1 pg.
"Group Chat?", [Online]. Retrieved from the Internet: <URL: http://help.trillian.im/discussions/mac/79-group-chat>, (Accessed Sep. 24, 2013), 2 pgs.

(Continued)

*Primary Examiner* — Jeong S Park
(74) *Attorney, Agent, or Firm* — Schwegman Lundberg & Woessner, P.A.

(57) ABSTRACT

A message machine may provide a message service that allows creation of a chat group in which multiple users are members. A member of the chat group may send a message to the chat group, which causes the message machine to send the message to each of the other members who are online in the message service. If one of the other members is offline in the message service, but is online in another message service, the message machine may relay the message to this member via the other message service, in which an online member of the chat group is socially connected to the offline member by the other message service. The message machine may access credentials of the online member, use these credentials to impersonate the online member, and send the message to the offline member through the other message service.

18 Claims, 8 Drawing Sheets

Relaying a Group Chat Message

(56) References Cited

OTHER PUBLICATIONS

"How to start a group chat for Trillian / Skype contacts", [Online]. Retrieved from the Internet: <URL: http://help.trillian.im/discussions/windows/3622-how-to-start-a-group-chat-for-trillian-skype-contacts>, (Accessed Sep. 24, 2013), 2 pgs.

"Starting a group chat", [Online]. Retrieved from the Internet: <URL: http://help.trillian.im/discussions/windows/5430-starting-a-group-chat>, (Accessed Sep. 24, 2013), 3 pgs.

"International Application Serial No. PCT/IN2013/000731, International Search Report mailed May 22, 2014", 6 pgs.

"International Application Serial No. PCT/IN2013/000731, Written Opinion mailed May 22, 2014" 11 pgs.

* cited by examiner

Relaying a Group Chat Message

*FIG. 3*

Relaying a Reply Message

GROUP MESSAGE RELAY

PRIORITY APPLICATION(S)

This application claims the benefit of priority under 35 U.S.C. §119(a)-(d) to Indian Application No. 944/MUM/2013, filed Mar. 21, 2013, and titled "Group Message Relay," which is incorporated herein by reference in its entirety.

TECHNICAL FIELD

The subject matter disclosed herein generally relates to the processing of data. Specifically, the present disclosure addresses systems and methods to facilitate communication of group messages.

BACKGROUND

Various message services are provided by various network-based systems (e.g., network-based messaging systems). In some of these systems, one or more server machines provide a message service by which a user of the messaging service may communicate a message (e.g., a chat message) with another user of the message service (e.g., one-on-one messaging or user-to-user messaging). For example, a device of one user may be configured to access the message service and use the message service to communicate a message to a device of another user. Some of these network-based systems support group messaging (e.g., group chat), in which a user of the message service may send a message to multiple users of the messaging service (e.g., one-to-many messaging).

In certain situations, a message service that communicates messages among its users quickly enough to enable real-time or near real-time conversations (e.g., instant messaging (IM) or short message service (SMS) messaging) may additionally allow the user of the message service to create or join a group of users of the message service. This group may be specifically created, configured, or otherwise intended for the purpose of communicating group messages among its members (e.g., participants in the group). Such a group may be called a "chat group" or similar phrase.

BRIEF DESCRIPTION OF THE DRAWINGS

Some embodiments are illustrated by way of example and not limitation in the figures of the accompanying drawings.

DETAILED DESCRIPTION

Example methods and systems are directed to relaying a group message (e.g., a group chat message). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A machine may be configured (e.g., by special-purpose software) to operate as a message machine (e.g., message service machine) in providing a message service in which users of the message service may communicate messages (e.g., chat messages or SMS messages) among each other (e.g., via devices that correspond to each of the users). Such a message machine may form all or part of a network-based (e.g., cloud-based) message server system that provides such a message service. Multiple message services may be available to a user, and the user may create and use corresponding access credentials for each of the multiple message services. By using such credentials, the user may access (e.g., login to) a message service and send messages, receive messages, or both using that message service.

In addition, a message service may be available (e.g., provided to the user) in conjunction with a social networking service (e.g., a network-based service that models, tracks, or provides features based on relationships among its users, such as Facebook® or Twitter®). Some message services (e.g., some socially networked message services) may restrict the user to communicating messages only with other users that are socially connected to the sending user. For example, a user may be limited to sending messages only to his "chat buddies," such as friends, connections, followers, or other users designated as his social connections. As another example, the user may be limited to receiving messages only from his chat buddies, such as friends, connections, followers, or other users designated as a social connections.

The message machine (e.g., a first message machine) may provide a message service (e.g., a first message service) that allows creation (e.g., by a user) of a chat group in which multiple users are members (e.g., participants). Generally, a member of the chat group may send a message to the entire chat group, which causes the message machine to distribute the message to each of the other members who are online (e.g., have an "online" status) in the message service. If one of the other members of the chat group is offline (e.g., has an "offline" status) in the message service, but is online in another message service (e.g., a second message service), the message machine may attempt to relay the message to this member via the other message service. This may be done where an online member of the chat group is socially connected to the offline member by the other message service (e.g., second message service). In such a case, the message machine may access credentials of the online member, use these credentials to impersonate the online member with respect to (e.g., during use of) the other message service, and send the message to the offline member as if the online member were sending a one-to-one message directly through the other message service.

Figure 1:
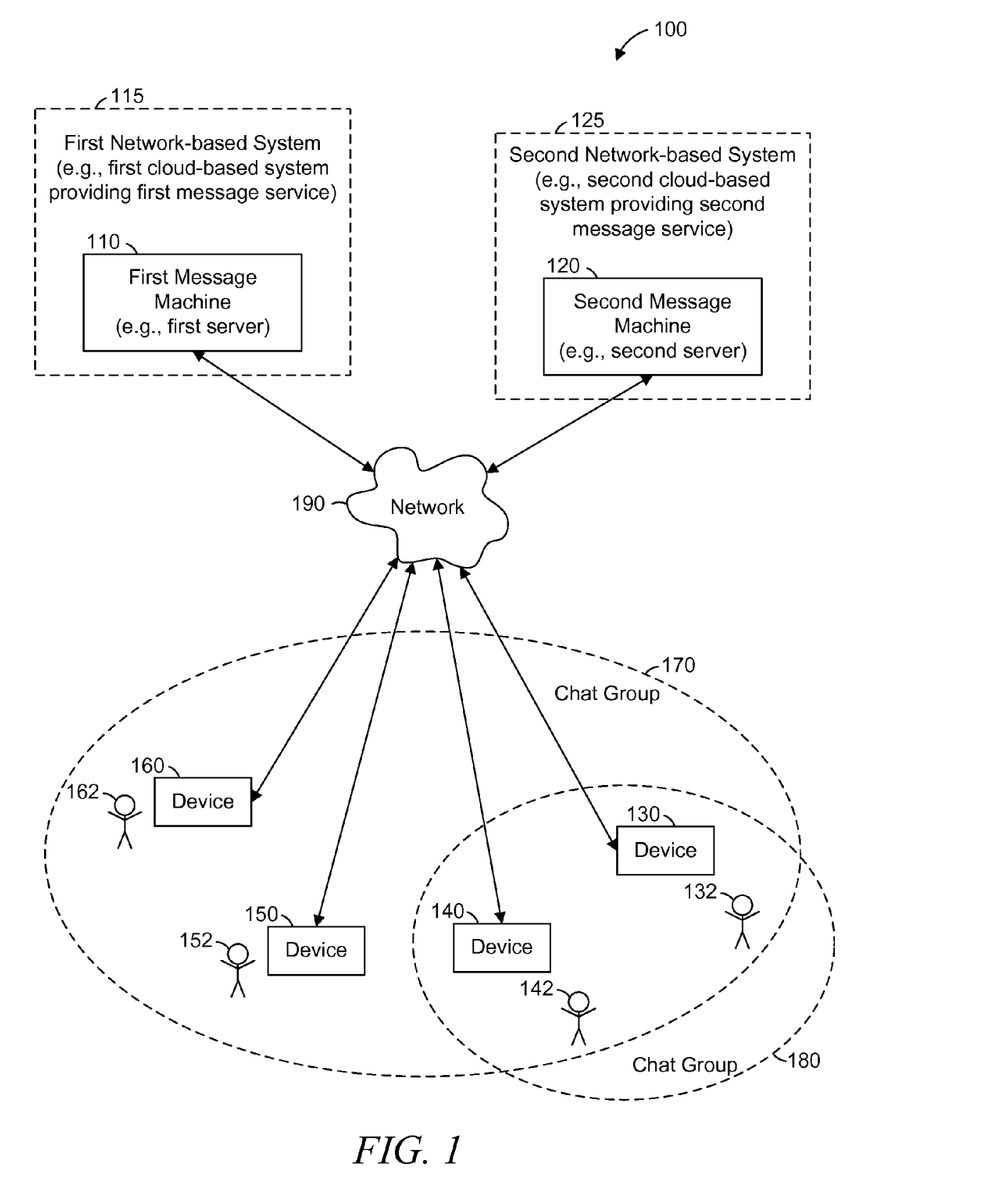
FIG. 1 is a network diagram illustrating a network environment suitable for group message relay, according to some example embodiments.

FIG. 1 is a network diagram illustrating a network environment 100, which may be configured to facilitate group message relay, according to some example embodiments. The network environment includes a first message machine 110

(e.g., a first message server machine), a second message machine 120 (e.g., a second message server machine), and devices 130, 140, 150, and 160 (e.g., user devices), all communicatively coupled to each other via a network 190. The first message machine 110, the second message machine 120, and the devices 130, 140, 150, and 160 may each be implemented in a computer system, in whole or in part, as described below with respect to FIG. 8.

As shown in FIG. 1, the first message machine 110 may form all or part of a first network-based system 115. The first network-based system 115, in turn, may form all or part of a first cloud-based system that provides a first message service (e.g., a first chat service, a first instant messaging service, or a first SMS service). Similarly, FIG. 1 depicts the second message machine 120 as forming all or part of a second network-based system 125. The second network-based system 125 may form all or part of a second cloud-based system that provides the second message service (e.g., a second chat service, a second instant messaging service, or a second SMS service).

Also shown in FIG. 1 are users 132, 142, 152, and 162. Any one or more of the users 132, 142, 152, and 162 may be a human user (e.g., a human being), a machine user (e.g., a computer configured by a software program to interact with a device), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Similarly, the user 142 is not part of the network environment 100, but is associated with the device 140. As an example, the device 140 may be a desktop computer, a vehicle computer, a tablet computer, a navigational device, a portable media device, or a smart phone belonging to the user 142. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152. Moreover, the user 162 is not part of the network environment 100, but is associated with the device 160. As an example, the device 160 may be a desktop computer, a vehicle computer, a tablet computer, a navigational device, a portable media device, or a smart phone belonging to the user 162.

In addition, FIG. 1 depicts a chat group 170, which is shown as encompassing the users 132, 142, 152, and 162 (e.g., along with their respective devices 130, 140, 150, and 160). The chat group 170 may be created and managed by the first message machine 110 (e.g., as part of providing the first message service). Hence, the user 132 may be a first member (e.g., first participant) of the chat group 170; the user 142 may be a second member (e.g., second participant) of the chat group 170; the user 152 may be a third member (e.g., third participant) of the chat group 170; and the user 162 may be a fourth member (e.g., fourth participant) of the chat group 170.

Furthermore, FIG. 1 depicts another chat group 180, which is shown as encompassing only the users 132 and 142 (e.g., along with the respective devices 130 and 140). The chat group 180 may also be created and managed by the first message machine 110 (e.g., as part of providing the first message service). Accordingly, the user 132 may be a first member (e.g., first participant) of the chat group 180, and the user 142 may be a second member (e.g., second participant) of the chat group 180.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the first message machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
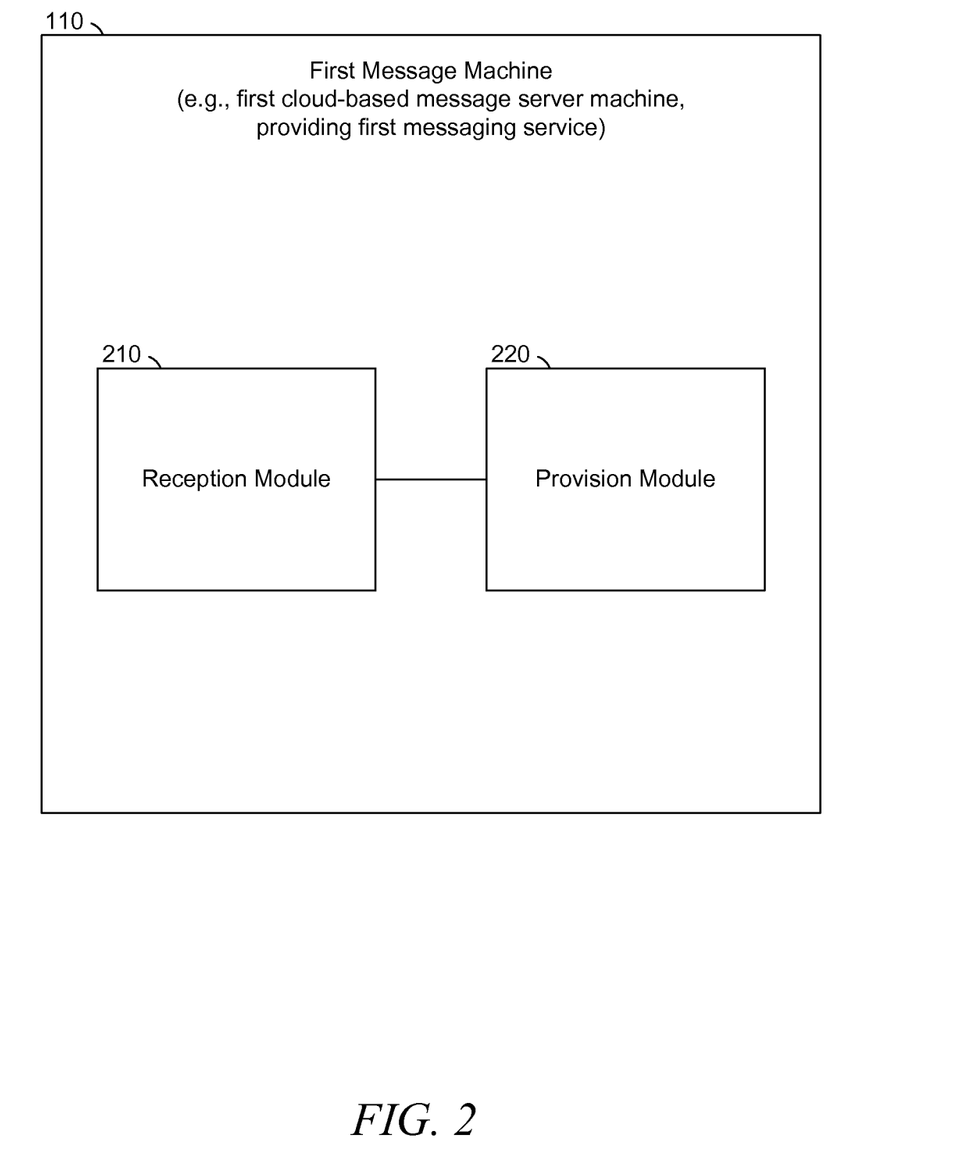
FIG. 2 is a block diagram illustrating components of a message machine, which may be configured to facilitate relay of group messages, according to some example embodiments.

FIG. 2 is a block diagram illustrating components of the first message machine 110, according to some example embodiments. The first message machine 110 may be or include a first cloud-based message server machine that provides all or part of a first message service (e.g., a first messaging service).

The first message machine 110 is shown as including a reception module 210 and a provision module 220, which may be configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
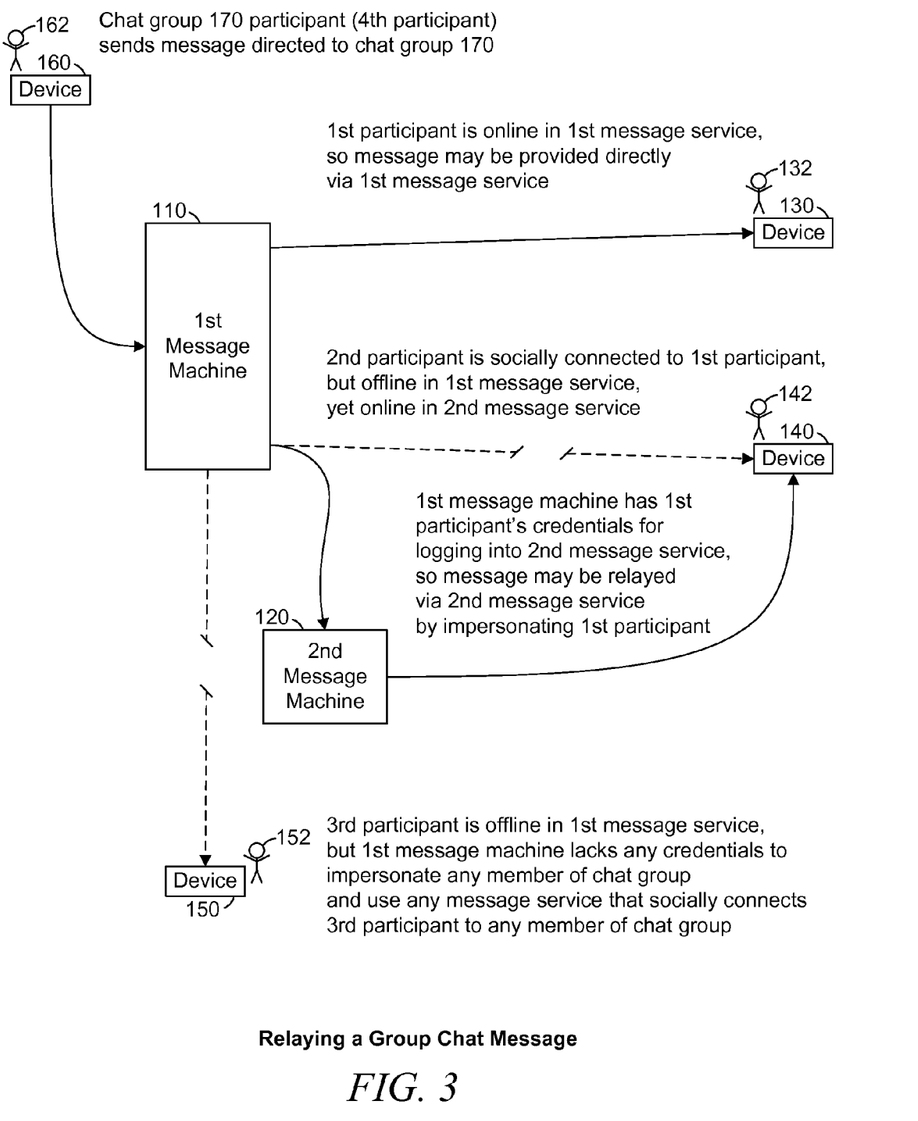
FIG. 3 is a conceptual diagram illustrating a group message being relayed by the message machine, according to some example embodiments.

FIG. 3 is a conceptual diagram illustrating a group message (e.g., group chat message) being relayed by the first message machine 110, according to some example embodiments. Starting from the top of FIG. 3, the user 162 may use his device 160 to send a message (e.g., a chat message, instant message, or an SMS message) that is directed to the chat group 170 (e.g., directed to the members of the chat group 170). As noted above, the user 162 may be a member (e.g., fourth participant) of the chat group 170.

The first message machine 110, as noted above, may provide a first message service, which may manage the chat group 170. As shown by the curved arrow, the first message machine 110 receives the message from the device 160 of the user 162. Since the message is directed at the chat group 170, the first message machine 110 attempts to distribute this message to each of the users 132, 142, and 152 (e.g., via their respective devices 130, 140, and 150), because the users 132, 142, and 152 are members of the chat group 170.

Regarding the user 132 (e.g., first participant in the chat group 170), the first message machine 110 may detect that the user 132 is online in the first message service. For example, the first message machine 110 may detect that the user 132 has an "online" status with respect to the first message service (e.g., a status that indicates availability for receiving messages via the first message service, in contrast with an "offline" status which may indicate that the user 132 is unable to receive messages via the first message service). Detection of such an online status may be performed by accessing information (e.g., stored in a database or in the first message machine 110) that describes a current status of the user 132 (e.g., a user profile). Since the user 132 is online in the first message service, the message sent by the user 162 may be provided to the user 132 (e.g., at his device 130) directly via the first message service. This is illustrated in FIG. 3 with a solid arrow from the first message machine 110 to the device 130. In this manner, where there are additional members of the chat group 170, the message may be provided to all online members of the chat group 170.

Regarding the user 142 (e.g., second participant in the chat group 170), the first message machine 110 may detect that the user 142 is offline in the first message service. For example, the first message machine 110 may detect that the user 142 has an "offline" status with respect to the first message service (e.g., a status that indicates an inability to receive messages via the first message service). As example scenarios, the user 142 might be unregistered (e.g., not registered) with the first message service, or the user 142 might be registered with the first message service but not currently logged into the first message service. Detection of such an offline status may be performed by accessing information (e.g., stored in a database or in the first message machine 110) that describes a current status of the user 142 (e.g., user profile). Since the user 142 is offline in the first message service, the message sent by the user 162 cannot be directly provided by the first message service to the user 142 (e.g., at his device 140). This is illustrated in FIG. 3 with a dashed broken arrow from the first message machine 110 to the device 140. Similarly, where there are additional members of the chat group 170, the first message service may be insufficient to directly provide the message from the user 162 to any offline member of the chat group 170.

In this situation, however, the first message machine 110 may relay the message through the second message machine 120 by impersonating the user 132 and using a second message service (e.g., provided by the second message machine 120) as the user 132. For example, the first message machine 110 may have or obtain credentials (e.g., username and password, or account number and personal identification number (PIN)) of the user 132 for accessing (e.g., logging into) a second message service that is provided by the second message machine 120. As noted in FIG. 3, by use of such credentials, the first message machine 110 may log into the second message service, detect that the user 142 is online in the second message service, and relay the message to the user 142 (e.g., at his device 140) by impersonating the user 132, who in this situation is socially connected to the user 142 (e.g., as a chat buddy, friend, connection, follower, other social connection, or any suitable combination thereof) by the second message service. The social connection from the user 132 to the user 142 may designate the user 132 as being authorized to send messages to the user 142 via the second message service.

Detecting that the user 142 is online in the second message service may be done by querying the second message service after logging in to it as the user 132. Relaying the message to the user 142 via the second message service may be done by inserting the contents of the message into a new message sent directly to the user 142 via the second message service. This is illustrated in FIG. 3 with solid curved arrows from the first message machine 110 to the second message machine 120 and then to the device 140. In this manner, where there are additional members of the chat group 170, the message may be provided to those offline members of the chat group 170 who are online in another message service and are socially connected to an online member whose credentials for accessing the other message service are known or obtainable.

Regarding the user 152 (e.g., third participant in the chat group 170), the first message machine 110 may detect that the user 152 is offline in the first message service. This may be performed in a manner similar to that described above for the user 142. As with the user 142, since the user 152 is offline in the first message service, the message sent by the user 162 cannot be directly provided by the first message service to the user 152 (e.g., at his device 150). This is illustrated in FIG. 3 with a dashed broken arrow from the first message machine 110 to the device 150.

However, as noted in FIG. 3, the first message machine 110 lacks (e.g., does not have, is unable to obtain, or both) any credentials of any member of the chat group 170 (e.g., user 132 or user 162) that would enable the first message machine 110 to impersonate such a member of the chat group 170 to another message service that socially connects that member to the user 152, and use that other message service to relay the message to the user 152 (e.g., at his device 150). The first message machine 110 may determine that it lacks such credentials by querying information (e.g., stored in a database or in the first message machine 110) that indicates for which online members of the chat group 170 such credentials are accessible (e.g., stored by the first message machine 110 or otherwise retrievable).

Accordingly, where there are additional members of the chat group 170, the first message machine 110 may be unable to provide the message to those offline members of the chat group 170 who are both (1) socially connected by another message service to an online member whose credentials for accessing that other message service are known or obtainable, and (2) offline in that other message service. Similarly, the first message machine 110 may be unable to provide the message to those offline members of the chat group 170 who are socially unconnected to any online member whose credentials for accessing another message service are known or obtainable. Likewise, the first message machine 110 may be unable to provide the message to those offline members the chat group 170 who are socially connected by another message service to an online member whose credentials for accessing that other message service are unknown or unobtainable.

Figure 4:
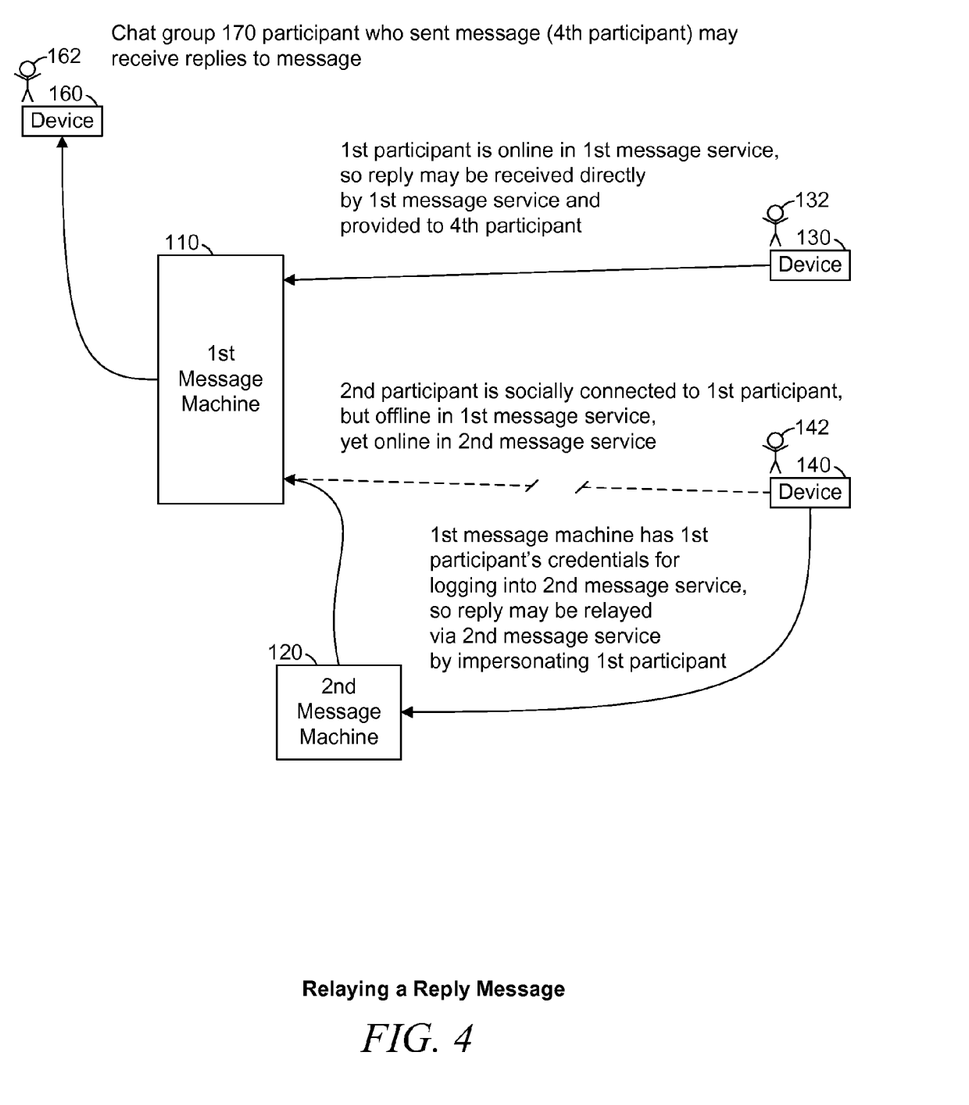
FIG. 4 is a conceptual diagram illustrating a reply to a group message being relayed by the message machine, according to some example embodiments.

FIG. 4 is a conceptual diagram illustrating a reply to the message that was relayed to the user 142 (e.g., via his device 140) according to the situation described in FIG. 3, according to some example embodiments. Starting from the right edge of FIG. 4, the users 132 and 142 (e.g., via their devices 130 and 140) have received the message sent from the user 162 (e.g., via his device 160 and distributed directly or indirectly by the first message machine 110). The device 130 of the user 132 may be configured (e.g., by appropriate software, such as a messaging application, applet, or mobile app) to communicate messages with the first message machine 110 (e.g., via the first message service, which is provided by the first message machine 110). Similarly, the device 140 of the user 142 may be configured to communicate messages with the second message machine 120 (e.g., via the second message service, which is provided by the second message machine 120).

Regarding the user 132 (e.g., first participant in the chat group 170), since the user 132 is online in the first message service, the first message machine 110 may directly receive a reply message (e.g., further message) from the user 132 (e.g., sent from his device 130). Such a reply message may be directed at the chat group 170 or directed at a subset thereof (e.g., directed only to the sender of the original message, the user 162), as indicated by information added (e.g., prepended or appended) to the reply message. Accordingly, the first message machine 110 may provide this reply message to one or more other members of the chat group 170, including the user 162 (e.g., at his device 160) who sent the original message to which the user 132 is replying. This is illustrated in FIG. 4 with a solid arrow from the device 130 to the first message machine 110. In this manner, where there are additional members of the chat group 170, replies may be directly received from all online members of the chat group 170, and distribution of such replies to the chat group 170 may proceed as described above with respect to FIG. 3.

Regarding the user 142 (e.g., second participant in the chat group 170), the first message machine 110 is unable to directly receive a message sent from the user 142 (e.g., via his device 140), because the user 142 is offline in the first message service. This is illustrated in FIG. 4 by a dashed broken arrow from the device 140 to the first message machine 110. However, indirect access to a reply message is possible by reversing the group message relay technique discussed above with respect to FIG. 3.

Since the user 142 is offline in the first message service yet online in the second message service, plus socially connected to the user 132 by the second message service, and since credentials of the user 132 for accessing the second message service are known or obtainable by the first message machine 110, a reply message from the user 142 may be received by the second message machine 120 (e.g., from the device 140) and accessed by the first message machine 110. For example, the first message machine 110 may use the credentials of the user 132 to log into the second message service and thereby access (e.g., read, copy, download, or retrieve) the reply message sent by the user 142. As with the user 132, such a reply message may be directed at the chat group 170 or directed at a subset thereof (e.g., directed only to the sender of the original message, the user 162), as indicated by information added (e.g., prepended or appended) to the reply message. This is illustrated in FIG. 4 with a curved arrow from the second message machine 120 to the first message machine 110.

Accordingly, the first message machine 110 may provide this reply message to one or more other members of the chat group 170, including the user 162 (e.g., at his device 160). This is illustrated in FIG. 4 with a curved arrow from the first message machine 110 to the device 160. In this manner, where there are additional members of the chat group 170, replies may be indirectly received from all offline members of the chat group 170 who are both (1) online in another message service, and (2) socially connected to an online member whose credentials for accessing that message service are known or obtainable.

Figure 5:
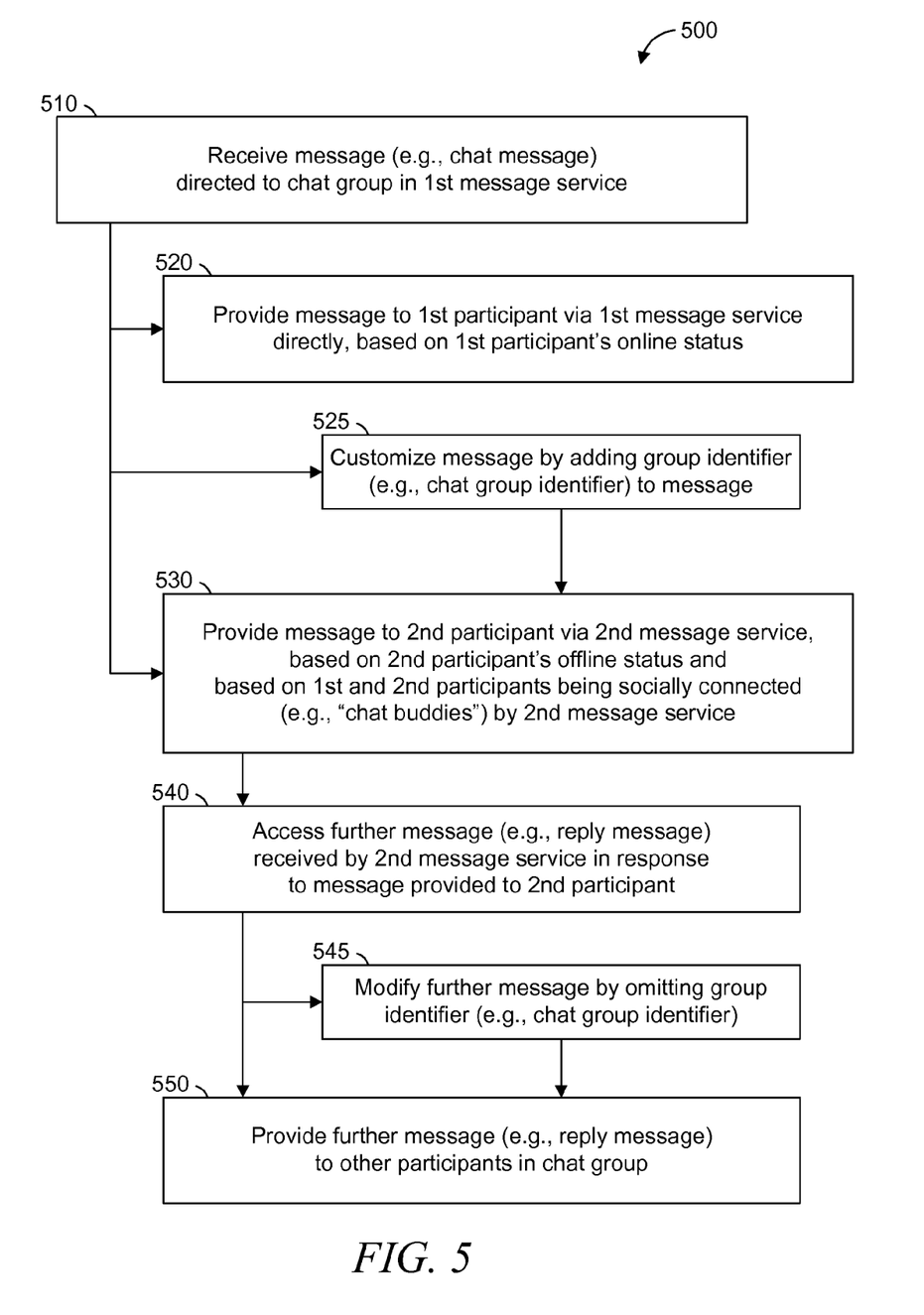
FIG. 5-7 are flowcharts illustrating operations of the message machine in performing a method of relaying a group message, according to some example embodiments.
Figure 6:
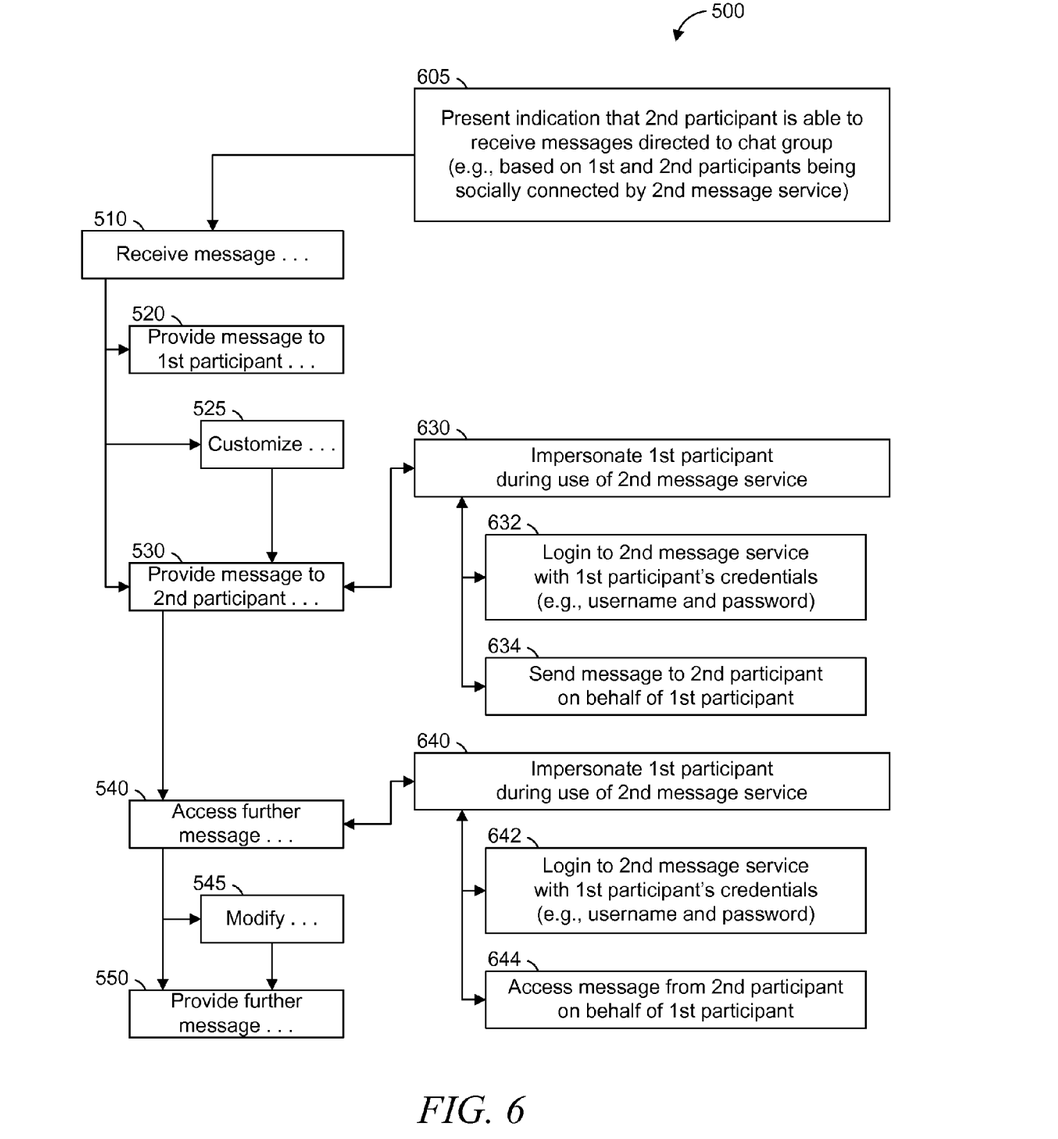
Figure 7:
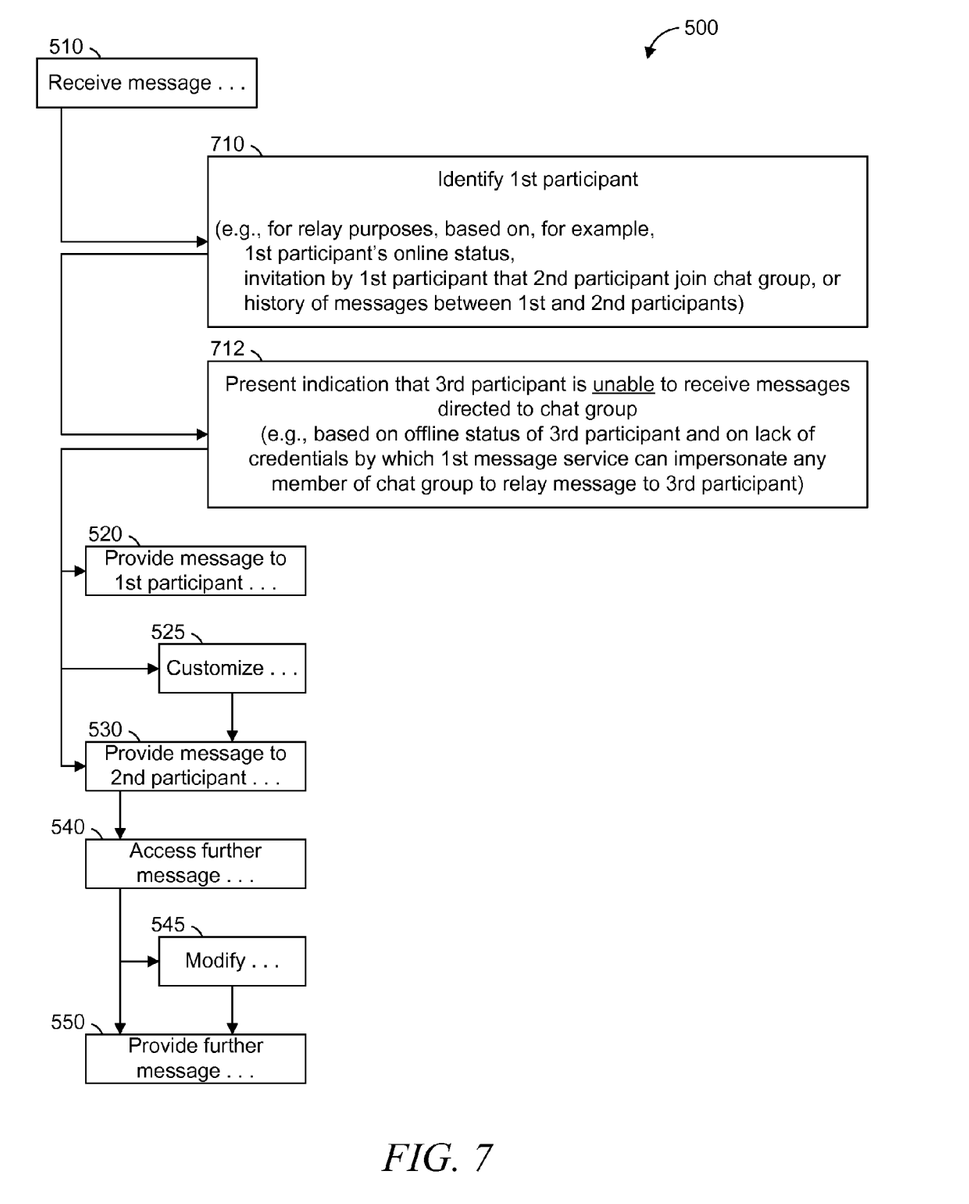

FIG. 5-7 are flowcharts illustrating operations of the first message machine 110 in performing a method 500 of relaying a message (e.g., a group message), according to some example embodiments. Operations in the method 500 may be performed by the first message machine 110, using modules described above with respect to FIG. 2. As shown in FIG. 5, the method 500 may include one or more of operations 510, 520, and 530.

In operation 510, the reception module 210 of the first message machine 110 receives a message (e.g., group chat message) that is directed to the chat group 170. As discussed above with respect to FIG. 3, this message may be sent by the user 162, who is a member of the chat group 170, and the message may therefore be received from the device 160 of the user 162.

As noted above, the chat group 170 exists within the first message service, which is provided by the first message machine 110, and the users 132 and 142 are members (e.g., first participant and second participant) in the chat group 170. As also noted above, the user 132 may be socially connected to the user 142 via a second message service, which may be provided by the second message machine 120, and the user 132 may have an online status within the first message service that is provided by the first message machine 110. As additionally noted above, the user 142 may have an offline status within the first message service, yet have an online status within a second message service that is provided by the second message machine 120. The offline status of the user 142 may indicate that the user 142 is unable to receive messages directed to the chat group 170 via the first message service directly. In some example embodiments, the offline status of the user 142 indicates that the user 142 is unregistered with the first message service (e.g., unregistered as a user of the first message service), that the user 142 is not logged in to the first message service, or both.

In operation 520, the provision module 220 of the first message machine 110 provides the message to the user 132 (e.g., at his device 130) via the first message service directly. Provision of the message to the user 132 may be based on (e.g., responsive to) the online status of the user 132 with respect to the first message service that is provided by the first message machine 110. As noted above, the online status of the user 132 may indicate that the user 132 is able to receive messages directed to the chat group 170 via the first message service directly (e.g., without relaying the message through another message service).

In operation 530, the provision module 220 provides the message to the user 142 (e.g., at his device 140) by relaying the message via the second message service, which is provided by the second message machine 120. An example embodiment of a technique for relaying the message is discussed above with respect to FIG. 3. The providing of the message (e.g., the relaying of the message) to the user 142 may be based on the offline status of the user 142 with respect to the first message service, based on the user 132 being socially connected to the user 142 by the second message service, based on credentials of the user 132 for accessing the second message service being known or obtainable by the provision module 220 (e.g., stored by the first message machine 110 or accessible from a database via the network 190), or based on any suitable combination thereof. Further details of operation 530 are discussed below with respect to FIG. 6.

In some example embodiments, the method 500 includes operation 525, in which the provision module 220 of the first message machine 110 customizes the message by adding a group identifier (e.g., a chat group identifier) to the message, prior to operation 530 in which the message (e.g., a customized message with the added group identifier) is provided to the user 142. The group identifier may identify the chat group 170. For example, the group identifier that uniquely identifies the chat group 170 among multiple chat groups (e.g., including chat group 180) that include the user 142 (e.g., second participant in the chat group 170).

According to certain example embodiments, the provision module 220 further customizes the message by including a link (e.g., a hyperlink to a uniform resource locator (URL)), where this link is operable by the user 142 to participate in the chat group 170 as an online member (e.g., as a member with an online status within the first message service) of the chat group 170, instead of as an offline member (e.g., as a member with an offline status within the first message service) of the chat group 170. If the link is operated by the user 142 using his device 140, the first message machine 110 (e.g., via its provision module 220) may configure the device 140 to directly access the first message service (e.g., by logging the user 142 into the first message service), which is provided by the first message machine 110. Accordingly, the user 142 may switch to an online status in the first message service and thereby be treated in a manner similar to that described above for the user 132 (e.g., first participant in the chat group 170).

In various example embodiments, for handling one or more replies to the message, the method 500 may include one or more of operations 540 and 550. In operation 540, the reception module 210 of the first message machine 110 accesses a message (e.g., reply message or further message) that is received by the second message service (e.g., provided by the second message machine 120) in response to the providing of the message (e.g., original message) to the user 142 in operation 530. The message may be directed to the chat group 170 or a subset thereof (e.g., directed to the user 162, who sent the original message). In example embodiments that include operation 525, the message accessed in operation 540 may include the group identifier discussed above with respect to operation 525. Further details of operation 540 are discussed below with respect to FIG. 6.

In operation 550, the provision module 220 of the first message machine 110 provides the message received in operation 540 (e.g., the reply message) to one or more other members of the chat group 170 (e.g., to the user 162 at his device 160). For example, if this message is received in operation 540 with the group identifier discussed above with respect to operation 525, the message may be directed at the chat group 170, and the provision module 220 may provide this message to as many members of the chat group 170 as possible, according to one or more of the techniques described above with respect to FIG. 3.

In some example embodiments, the method 500 includes operation 545, in which the provision module 220 modifies the message (e.g., the reply message) by omitting the group identifier discussed above with respect to operation 525. For example, the message may include the group identifier when the message is received in operation 540, and the provision module 220 in performing operation 545 may modify the message by omitting the group identifier, prior to providing the message without the group identifier to other members of the chat group 170 (e.g., user 162) in operation 550. This may have the effect of making the relaying of messages through the second message service (e.g., provided by the second message machine 120) transparent from the perspective of members of the chat group 170 who are online in the first message service (e.g., user 132).

As shown in FIG. 6, the method 500 may include one or more of operations 605, 630, and 640. In operation 605, the provision module 220 of the first message machine 110 presents an indication that the user 142 (e.g., second participant in the chat group 170) is able to receive messages directed to the chat group 170. This indication may be presented to one or more of the online members of the chat group 170 (e.g., user 132 via his device 130, user 162 via his device 160, or both).

The presenting of this indication may be based on the user 132 and the user 142 being socially connected by the second message service (e.g., as chat buddies authorized to send messages to each other using the second message service), which is provided by the second message machine 120, based on the users 132 and 142 (e.g., as first and second participants in the chat group 170) both having online statuses within the second message service, or based on both. In some example embodiments, the indication is presented within a user interface for the first message service (e.g., a user interface displayed by an application, applet, or mobile app that corresponds the first message service), and the indication may take the form of an icon that corresponds to the user 142, a list that includes the user 142, or a visual effect applied to a user name for the user 142 (e.g., a particular font, background, or highlighting), or any suitable combination thereof.

Operation 630 may be performed as part (e.g., a precursor task, a subroutine, or a portion) of operation 530, in which the provision module 220 of the first message machine 110 provides a message (e.g., the original message directed at the chat group 170) to the user 142. In operation 630, the provision module 220 impersonates the user 132 (e.g., the first participant in the chat group 170) during use of the second message service, which is provided by the second message machine 120. In other words, the provision module 220 may use the second message service as if the user 132 were using the second message service.

One or more of operations 632 and 634 may be performed as part of operation 630. In operation 632, the provision module 220 logs into the second message service with credentials of the user 132 (e.g., first participant in the chat group 170). For example, the provision module 220 may access credentials from a database (e.g., stored by the first message machine 110 or accessible via the network 190) and use these credentials to log into the second message service. This may have the effect of impersonating the user 132 to access the second message service and access the ability of the user 132 to send a message to the user 142 via the second message service.

In operation 634, the provision module 220 sends the message (e.g., the original message directed at the chat group 170) via the second message service to the user 142 (e.g., second participant). The sending of the message may be performed on behalf of the user 132 (e.g., first participant). This may have the effect of relaying the message through the second message service to reach the user 142 (e.g., at his device 140).

Operation 640 may be performed as part of operation 540, in which the reception module 210 of the first message machine 110 accesses a message (e.g., reply message) received by the second message service in response to the message (e.g., original message) provided to the user 142 in operation 530. In operation 640, the reception module 210 impersonates the user 132 (e.g., the first participant in the chat group 170) during use of the second message service, which is provided by the second message machine 120. In other words, the reception module 210 may use the second message service as if the user 132 were using the second message service.

One or more of operations 642 and 644 may be performed as part of operation 640. In operation 642, the reception module 210 logs into the second message service with credentials of the user 132 (e.g., first participant in the chat group 170). For example, the reception module 210 may access credentials from a database (e.g., stored by the first message machine 110 or accessible via the network 190) and use these credentials to log into the second message service. This may have the effect of impersonating the user 132 to access the second message service and access the ability of the user 132 to read a message received by the second message service from the user 142.

In operation 644, the reception module 210 accesses the message (e.g., the reply message, which may be directed at the chat group 170) that was received by the second message service from the user 142 (e.g., second participant). The accessing of the message may be performed on behalf of the user 132 (e.g., first participant). This may have the effect of accessing the message through the second message service so that it may be subsequently relayed to other members of the chat group 170 (e.g., at their respective devices).

As shown in FIG. 7, the method 500 may include one or more of operations 710 and 712. In some situations, the user 142 (e.g., second participant in the chat group 170) is socially connected to more than one online member of the chat group 170 by the second message service (e.g., provided by the second message machine 120). In such situations, the reception module 210 of the first message machine 110 may identify a suitable member of the chat group 170 (e.g., user 132) for impersonation, as part of the group message relaying techniques described herein. Accordingly, in operation 710, the reception module 210 identifies the user 132 (e.g., first participant in the chat group 170) based on the online status of the user 132 in the second message service (e.g., as provided by the second message machine 120).

In some cases, more than one online member of the chat group 170 has an online status in the second message service. In such cases, the reception module 210 may perform operation 710 by identifying a suitable member of the chat group 170 for impersonation, based on one or more additional factors. For example, the user 132 may be identified based on an invitation (e.g., previously sent) by the user 132 (e.g., first participant) that the user 142 (e.g., second participant) join the chat group 170. As another example, the user 132 may be identified based on a history of messages exchanged between the user 132 (e.g., first participant) and the user 142 (e.g., second participant). That is, the history of messages may indicate that the user 132 is someone who frequently communicates with the user 142 (e.g., a most frequent chat buddy, one of the top ten most frequent chat buddies, or at least a monthly chat buddy), and the reception module 210 may identify the user 132 for impersonation based on such an indication.

In operation 712, the provision module 220 of the first message machine 110 presents an indication that the user 152 (e.g., third participant in the chat group 170) is unable to receive messages directed to the chat group 170. This indication may be presented to one or more of the online members of the chat group 170 (e.g., user 132 via his device 130, user 162 via his device 160, or both).

The presenting of this indication may be based on the user 152 (e.g., third participant) having an offline status in the first message service, which is provided by the first message machine 110. The presenting of this indication may also be based on the user 152 (e.g., third participant) being both (1) socially connected by the second message service to an online member (e.g., user 132) whose credentials for accessing the second message service are known or obtainable by the reception module 210, the provision module 220, or both, and (2) offline in the second message service. Similarly, this indication may be presented based on the user 152 (e.g., third participant) being socially unconnected to any online member of the chat group 170 whose credentials for accessing another message service are known or obtainable by the reception module 210, the provision module 220, or both. Likewise, this indication may be presented based on the user 152 (e.g., third participant) being socially connected by another message service to an online member of the chat group 170, but whose credentials for accessing that other message service are unknown or unobtainable by the reception module 210, the provision module 220, or both.

In some example embodiments, the indication is presented within a user interface for the first message service (e.g., a user interface displayed by an application, applet, or mobile app that corresponds the first message service), and the indication may take the form of an icon that corresponds to the user 152, a list that includes the user 152, or a visual effect applied to a user name for the user 152 (e.g., a particular font, background, or highlighting), or any suitable combination thereof.

According to various example embodiments, one or more of the methodologies described herein may facilitate relaying of messages in a group chat environment. Moreover, one or more of the methodologies described herein may facilitate convenient and intuitive use of group messaging features, even when not all members of a chat group are online with respect to the message service that created or manages the chat group. Hence, one or more the methodologies described herein may facilitate group messaging environments with multiple message services and in which users need not maintain online statuses in all message services at once.

When these effects are considered in aggregate, one or more of the methodologies described herein may obviate a need for certain efforts or resources that otherwise would be involved in communicating group messages among members of the chat group. Efforts expended by a user or a message service provider in relaying messages directed to a group may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 8:
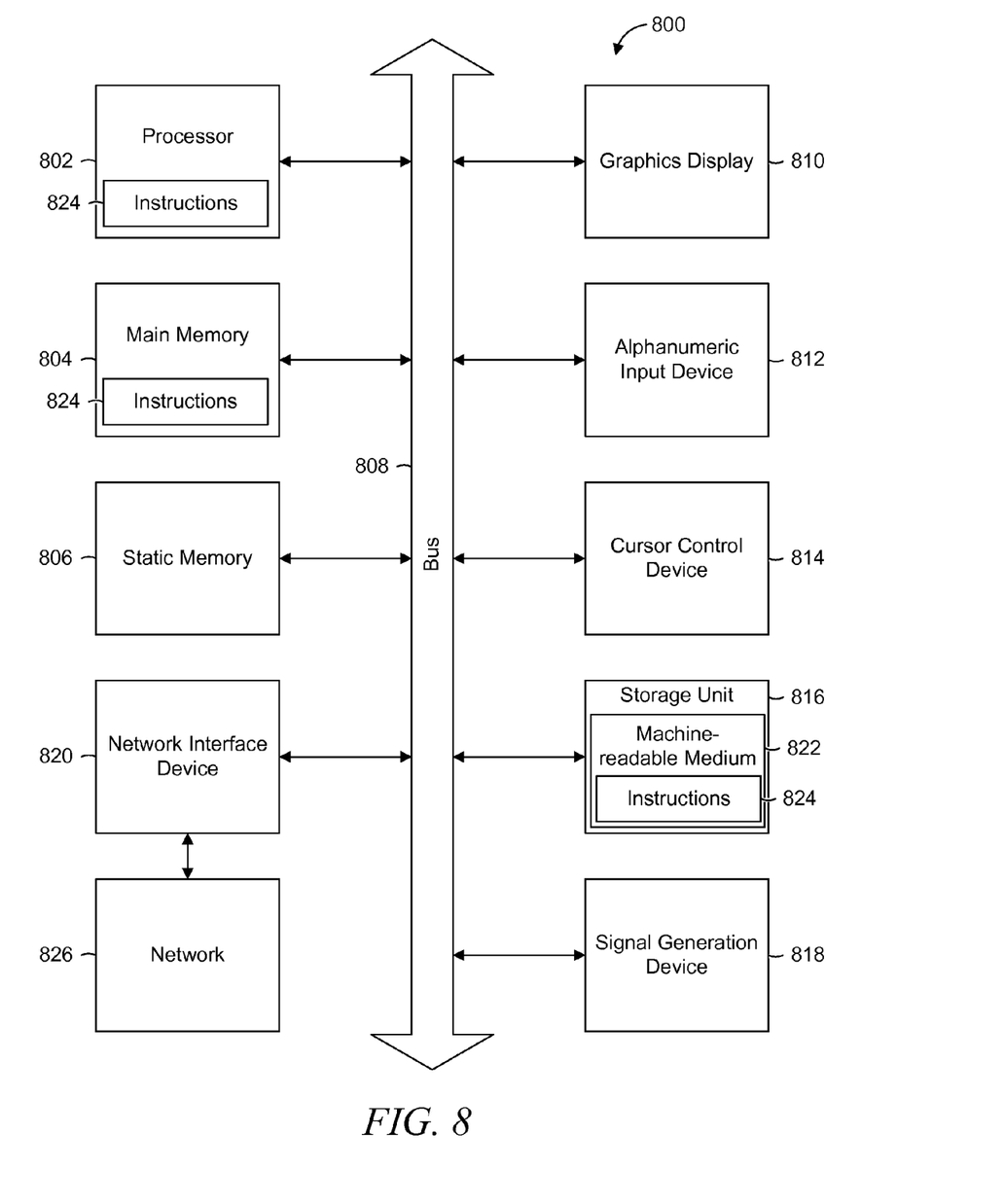
FIG. 8 is a block diagram illustrating components of a machine, according to some example embodiments, able to read instructions from a machine-readable medium and perform any one or more of the methodologies discussed herein.

FIG. 8 is a block diagram illustrating components of a machine 800, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 8 shows a diagrammatic representation of the machine 800 in the example form of a computer system and within which instructions 824 (e.g., software, a program, an application, an applet, an app, or other executable code) for causing the machine 800 to perform any one or more of the methodologies discussed herein may be executed, in whole or in part. In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a distributed (e.g., peer-to-peer) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include a collection of machines that individually or jointly execute the instructions 824 to perform all or part of any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The machine 800 may further include a graphics display 810 (e.g., a plasma display panel (PDP), a light emitting diode (LED) display, a liquid crystal display (LCD), a projector, or a cathode ray tube (CRT)). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a speaker), and a network interface device 820.

The storage unit 816 includes a machine-readable medium 822 on which is stored the instructions 824 embodying any one or more of the methodologies or functions described herein. The instructions 824 may also reside, completely or at least partially, within the main memory 804, within the processor 802 (e.g., within the processor's cache memory), or both, during execution thereof by the machine 800. Accordingly, the main memory 804 and the processor 802 may be considered as machine-readable media. The instructions 824 may be transmitted or received over a network 826 (e.g., network 190) via the network interface device 820.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 800), such that the instructions, when executed by one or more processors of the machine (e.g., processor 802), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output.

Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
receiving a chat message that is directed to a chat group in a first message service and in which a first participant and a second participant are members of the chat group,
the first participant being socially connected to the second participant via a second message service and having an online status within the first message service,
the second participant having an offline status within the first message service; and
providing the chat message to the second participant via the second message service based on the offline status of the second participant and based on the first and second participants being socially connected to each other by the second message service, the providing of the chat message to the second participant via the second message service including impersonating the first participant during use of the second message service, the impersonating of the first participant during use of the second message service including logging into the second message service with credentials of the first participant and sending the chat message to the second participant on behalf of the first participant, the providing of the chat message being performed by a processor of a machine.

2. The method of claim 1, wherein:
the second message service socially connects the first participant to the second participant by designating the first participant as authorized to send messages to the second participant via the second message service.

3. The method of claim 1, wherein:
the online status of the first participant indicates that the first participant is able to receive messages directed to the chat group via the first message service directly; and the method further comprises
providing the chat message to the first participant via the first message service directly based on the online status of the first participant.

4. The method of claim 1, wherein:
the offline status of the second participant indicates that the second participant is unable to receive messages directed to the chat group via the first message service directly.

5. The method of claim 4, wherein:
the offline status of the second participant indicates at least one of the second participant being unregistered as a user of the first message service or the second participant being not logged into the first message service.

6. The method of claim 1 further comprising:
presenting an indication that the second participant is able to receive messages directed to the chat group,
the presenting of the indication being based on the first and second participants being socially connected by the second message service.

7. The method of claim 6, wherein:
the presenting of the indication is based on the first and second participants both having online statuses within the second message service.

8. The method of claim 1 further comprising:
customizing the chat message for the second participant by adding a group identifier to the chat message; and wherein the providing of the chat message to the second participant provides the customized chat message with the added group identifier to the second participant.

9. The method of claim 8, wherein:
the group identifier uniquely identifies the chat group among multiple chat groups that include the second participant.

10. The method of claim 8, wherein:
the customized chat message includes a link that is operable by the second participant to participate in the chat group as a member with an online status within the first message service.

11. The method of claim 8 further comprising:
accessing a further chat message that includes the group identifier and is received by the second message service from the second participant in response to the providing of the customized chat message,
the accessing of the further chat message including the impersonating of the first participant during use of the second message service.

12. The method of claim 11, wherein:
the further chat message is directed to the chat group; and the method further comprises
providing the further chat message to multiple participants in the chat group.

13. The method of claim 12 further comprising:
modifying the further chat message by omitting the group identifier from the further chat message; and wherein
the providing of the further chat message provides the modified further chat message without the group identifier to a third participant.

14. The method of claim 1 further comprising:
identifying the first participant among multiple participants in the chat group based on at least one of:
the online status of the first participant,
an invitation by the first participant that the second participant join the chat group, or
a history of messages communicated between the first participant and the second participant.

15. The method of claim 1, wherein:
a third participant in the chat group has an offline status within the first message service,
the offline status of the third participant indicating that the third participant is unable to receive messages directed to the chat group via the first message service directly;
the first message service lacks credentials usable to impersonate any member of the chat group and use any message service that socially connects the third participant to the member of the chat group; and the method further comprises
presenting an indication that the third participant is unable to receive messages directed the chat group,
the presenting of the indication being based on the offline status of the third participant and based on the first message service lacking the credentials.

16. A non-transitory machine-readable storage medium comprising instructions that, when executed by one or more processors of a machine, cause the machine to perform operations comprising:
receiving a chat message that is directed to a chat group in a first message service and in which a first participant and a second participant are members of the chat group,
the first participant being socially connected to the second participant via a second message service and having an online status within the first message service,
the second participant having an offline status within the first message service; and
providing the chat message to the second participant via the second message service based on the offline status of the second participant and based on the first and second participants being socially connected to each other by the second message service, the providing of the chat message to the second participant via the second message service including impersonating the first participant during use of the second message service, the impersonating of the first participant during use of the second message service including logging into the second message service with credentials of the first participant and sending the chat message to the second participant on behalf of the first participant, the providing of the chat message being performed by the one or more processors of the machine.

17. A system comprising:
a reception module configured to receive a chat message that is directed to a chat group in a first message service and in which a first participant and a second participant are members of the chat group,
the first participant being socially connected to the second participant via a second message service and having an online status within the first message service,
the second participant having an offline status within the first message service; and
a processor configured by a provision module to provide the chat message to the second participant via the second message service based on the offline status of the second participant and based on the first and second participants being socially connected to each other by the second message service, the providing of the chat message to the second participant via the second message service including impersonating the first participant during use of the second message service, the impersonating of the first participant during use of the second message service including logging into the second message service with credentials of the first participant and sending the chat message to the second participant on behalf of the first participant.

18. The system of claim 17, wherein:
the provision module configures the processor to customize the chat message for the second participant by adding a group identifier to the chat message;
the provision module configures the processor, in the providing of the chat message to the second participant, to provide the customized chat message with the added group identifier to the second participant; and
the reception module is configured to access a further chat message that includes the group identifier and is received by the second message service from the second participant in response to the providing of the customized chat message,
the accessing of the further chat message including the impersonating of the first participant during use of the second message service.

* * * * *